United States Patent [19]
Morioka

[11] Patent Number: 4,572,879
[45] Date of Patent: Feb. 25, 1986

[54] LEAD-ACID CELL AND METHOD OF PRODUCING SAME

[75] Inventor: Yuji Morioka, Hyogo, Japan

[73] Assignee: Sanyo Electric Co., Ltd., Japan

[21] Appl. No.: 482,994

[22] PCT Filed: Jul. 21, 1982

[86] PCT No.: PCT/JP82/00282
§ 371 Date: Mar. 9, 1983
§ 102(e) Date: Mar. 9, 1983

[87] PCT Pub. No.: WO83/00583
PCT Pub. Date: Feb. 17, 1983

[30] Foreign Application Priority Data

| Jul. 31, 1981 | [JP] | Japan | 56-121009 |
| Aug. 3, 1981 | [JP] | Japan | 56-115765[U] |
| Apr. 16, 1982 | [JP] | Japan | 57-64541 |
| May 7, 1982 | [JP] | Japan | 57-66954[U] |
| May 12, 1982 | [JP] | Japan | 57-80493 |

[51] Int. Cl.⁴ .......................................... H01M 4/14
[52] U.S. Cl. ................................. 429/94; 429/225; 429/234; 429/245
[58] Field of Search ............. 429/234, 233, 237, 245, 429/94, 225, 241

[56] References Cited

U.S. PATENT DOCUMENTS

| 2,834,825 | 5/1958 | Wenzelberger | 429/234 X |
| 4,221,854 | 9/1980 | Hammar et al. | 429/234 |
| 4,223,081 | 9/1980 | Faber | 429/234 |
| 4,237,205 | 12/1980 | Matter | 429/234 |
| 4,363,857 | 12/1982 | Mix | 429/234 |
| 4,439,916 | 4/1984 | Faber | 429/234 X |

FOREIGN PATENT DOCUMENTS

48-40365 11/1973 Japan .

*Primary Examiner*—Anthony Skapars
*Attorney, Agent, or Firm*—Darby & Darby

[57] ABSTRACT

A lead-acid cell wherein current collectors (1, 5) constituting negative and positive plates opposed to each other with a separator (3) interposed therebetween which separator retains an electrolyte. One surface of each flat plate-like current collector (1, 5) has closely contacted therewith an active material layer (2, 4) having a net-like body embedded therein, and the current collector constituted of the active material layer (2, 4) and the current collector (1, 5) is disposed so that its side where the corresponding active material layer (2, 4) is formed is opposed to the separator (3).

4 Claims, 17 Drawing Figures

LEAD-ACID CELL AND METHOD OF PRODUCING SAME

FIELD OF THE ART

This invention relates to a lead-acid cell and a method of producing the same and particularly it relates to improvements in a current collector and improvements in an electrode plate construction based thereon.

BACKGROUND ART

Generally, a lead-acid cell comprises a negative plate and an positive plate which are opposed to each other with a separator interposed therebetween which separator retains an electrolyte. The negative and positive plates each comprises a layer of corresponding active material and a current collector disposed in contact with said layer.

As for the current collector, conventionally, a net-like body made of lead or lead alloy has been used. To obtain such a net-like body, a casting method, a method of punching flat plates or an expand working method such as the one shown in U.S. Pat. No. 3,867,200 has been applied. To form an electrode plate using a current collector formed of such a net-like body, it has been practiced to apply to both surfaces of this current collector an active material paste obtained by mixing a lead powder, a lead oxide powder or a lead sulfate powder with water or sulfuric acid and kneading it, and dry the same.

The net-like metal body serving as the current collector is a conductor for taking out the electromotive force produced by a chemical reaction taking place in the cell and plays the role of a support for the active material, being essential for making up the electrode plate. Thus, in order for the current collector to play such a role, it has been believed necessary for the current collector to have the complicated shape of being net-like, which accounts for the fact that heretofore, in order to obtain current collectors, casting methods, punching methods and expand working methods have inevitably been employed.

However, these methods to obtain current collectors and net-like current collectors obtained thereby offer some problems to be solved. The production of current collectors by casting methods involves treatment of a melt of lead or lead alloy, which makes the operation troublesome, lowers productivity and causes environmental problems due to the emission of lead vapor. In the production by punching methods, the operation is troublesome and the productivity is low and, moreover, there is a problem of material loss. The production by expand working methods also involves a troublesome operation. Whichever of these production methods may be used, since stress strains remain in the knots which are the intersections of the meshes of the net-like current collector, they are liable to be corroded by the electrolyte. To prevent this, it is necessary to increase the thickness of the current collector, but this approach run counter to reduction of the size or thickness of lead-acid cells using such current collectors. Particularly, this corrosion phenomenon is remarkable in the positive plate. This is because, in the case of the positive plate, as charging and discharging are repeated, the electrode plate expands and stress develops in the current collector, accelerating corrosion phenomenon.

For example, in a cylindrical lead-acid cell, the electricity generating element including the negative and positive plates is in circinately wound form. Such wound generating element is inserted into the cylindrical electrolytic container and after an electrolyte is poured in, the container is sealed to complete the cell.

If the mechanical strength of the net-like current collector used for the electrode plate in such a cylindrical lead-acid cell is too much increased, the electrode plate cannot be circinately wound. Thus, it is inevitable to make the mechanical strength of the current collector somewhat low. Therefore, it becomes necessary to exercise scrupulous care in handling the current collector, while the separator used is also lower in mechanical strength. Therefore, in winding the generating element, special care is necessary and, moreover, it has been very difficult to circinately wind it firmly.

DISCLOSURE OF THE INVENTION

The inventor of this application, paying attention to the problems caused by the net-like current collector, has investigated the relationship between the cell performance and the degree of adhesion between the active material and the current collector. As a result, it has been found that the degree of adhesion has no influence on the cell performance and that it is only necessary for the active material and the current collector to be in contact with each other, not requiring particularly strong adhesion. In other words, where a net-like metal body is used as a current collector, the only effect obtained is that it increases the retaining force on the active material, preventing the active material from falling off, and as to donation and acceptance of electrons, there is no difference from a flat plate-like metal body.

The reason is believed to be that in the negative plate, even if the active material is loosely applied, a charging operation during formation process causes the active material to be fixed to the current collector. Further, in the positive plate, although said phenomenon appearing in the negative plate is not seen, it seems that the reason is that the corroded layer on the current collector surface and the active material beautifully intertwine each other and that the lead dioxide, which is the product of charging, is electrically conductive.

In addition, in an electrode plate using a flat plate-like current collector, the reaction of the active material proceeds from the surface layer on this current collector inwardly in the direction of the thickness. Thus, speaking of the position of the current collector, positioning it on the back side of the active material layer opposed to the opposite pole will ensure that the reaction proceeds efficiently.

As described above, if consideration is given only to falling off of the active material during production of electrode plates, it is not necessary to give any complicated shape to the current collector and it is possible to replace it by a flat plate-like metal body. On the other hand, during charging and discharging of the cell, there takes place a phenomenon of expansion and contraction of the active material. In the lead-acid cell, a phenomenon of expansion corresponding to the frequency of charging and discharging takes place in the positive plate. Further, a phenomenon of contraction takes place in the negative plate. Also with the sense of preventing such expansion and contraction from proceeding, in the past, net-like metal bodies have been used as current collectors. However, lead or lead alloys cannot be said to be very superior in resistance to stress. If, therefore, lead or lead alloys are satisfactory, it is possible to substitute nets or net-like moldings of high molecular materials such as polypropylene. According to experiments conducted by the inventor, by embedding a 0.14 mm wire diameter and 15-mesh polyethylene net in a 1.5 mm-thick active material layer obtained from an ordinary active material paste, expansion of the active material layer in the horizontal direction with respect to the pole plate surface of the positive plate was substantially prevented. As for expansion of the active material layer in the vertical direction, it can be prevented by the lateral wall surface of the electrolytic container. On the other hand, although the same may be said of the negative plate, generally, it is possible to prevent contraction by suitably controlling the amount of an expander (such as lignisulfonic acid) added to the negative active material. Therefore, as to the negative plate, it is not necessary to use a net or the like applied to the positive plate.

This invention has been accomplished on the basis of the aforesaid facts and its essence resides in the fact that of the negative and positive plates opposed to each other with a separator interposed therebetween which separator retains an electrolyte, at least one electrode plate is formed of a flat plate-like current collector made of lead or lead alloy, said flat plate-like current collector having an active material layer closely contacted therewith to form said at least one electrode plate, the latter being then positioned so that its side having the active material layer formed thereon is opposed to the separator.

In a preferred embodiment, the electrode plate using a flat plate-like collector as described above is used as the positive plate. Further, a net-like body of resin is embedded in the active material layer to increase the mechanical strength of the active material layer. Preferably, this net-like body is disposed at a position where it does not contact the current collector. That is, in a lead-acid cell, since the active material and the product of corrosion on the current collector surface in the presence of the electrolyte which is sulfuric acid are the same compositions, the binding force on them is strong and the electricity collecting effect increases. Therefore, in embedding a net-like body in the active material layer, it is effective to embed it in the active material layer at a position where it does not contact the current collector.

In another preferred embodiment of the invention, there is provided an electrolyte-resistant band-like insulation layer interposed partly between the current collector and the active material layer. This band-like insulation layer extends toward an electron take-out portion provided on the current collector. The band-like insulation layer prevents corrosion of the portion covered thereby and makes it possible to maintain the electricity collecting effect. Therefore, it is possible to improve the cycle characteristic liable to be degraded by corrosion of the current collector.

In a further embodiment of the invention, there is provided a method of producing cylindrical lead-acid cells wherein a generating element including the electrode plates and separator is circinately wound. In this production method, a generating element is first prepared wherein placed on one surface of a current collector assembly including two flat plate-like current collectors laminated with an insulator interposed therebetween is an active material sheet assembly including negative and positive active material sheets laminated with a separator interposed therebetween. With the current collector assembly positioned outside the active material sheet assembly, the generating element is circinately wound, whereby a circinate winding is obtained wherein the negative active material sheet is closely contacted with one current collector and the positive active material sheet is contacted with the other current collector. In this winding operation, a winding jig is used to hold the initial end of winding of the current collector assembly, and winding is effected with said winding jig as a core. According to this embodiment, since the current collector assembly is a part having relatively high mechanical strength, it is possible to firmly hold the current collector assembly by the winding jig. Further, at the start of winding, the current collector assembly of high mechanical strength is first wound, so that even if this part is bent at a great curvature, there is no danger of the current collector assembly or the separator and active material sheet having a low mechanical strength being broken. Further, the press rollers or the like for imparting a tying force to the generating element in wound condition while winding it can be brought into contact with the current collector assembly of high mechanical strength at all times. For this reason, it is possible, without having to pay any special attention, to effect firm winding and increase the degree of contact of the negative and positive active material sheets with the respective corresponding current collectors.

Accordingly, a principal object of this invention is to provide a electrode plate construction not requiring any complicated processing in a lead-acid cell.

Another object of the invention is to provide a current collector produced by using a smaller amount of metal than a conventional net-like current collector and yet having the same degree of conductivity, thus making it possible to reduce the weight and size of lead-acid cells.

A further object of the invention is to provide a lead-acid cell having current collectors superior in corrosion resistance.

A further object of the invention is to provide an efficient method of producing lead-acid cells having a circinately wound generating element, wherein the elements constituting the generating element can be strongly wound without being damaged.

Other objects and features of the invention will become more apparent from a detailed description to be given with reference to the drawings.

BRIEF DESCRIPTION OF THE DRAWINGS

FIGS. 14 through 17 show the steps for producing a cylindrical lead-acid cell as a still further embodiment of the invention, wherein

BEST MODE FOR CARRYING OUT THE INVENTION

Figures 1, 2, 3, 6, 7:
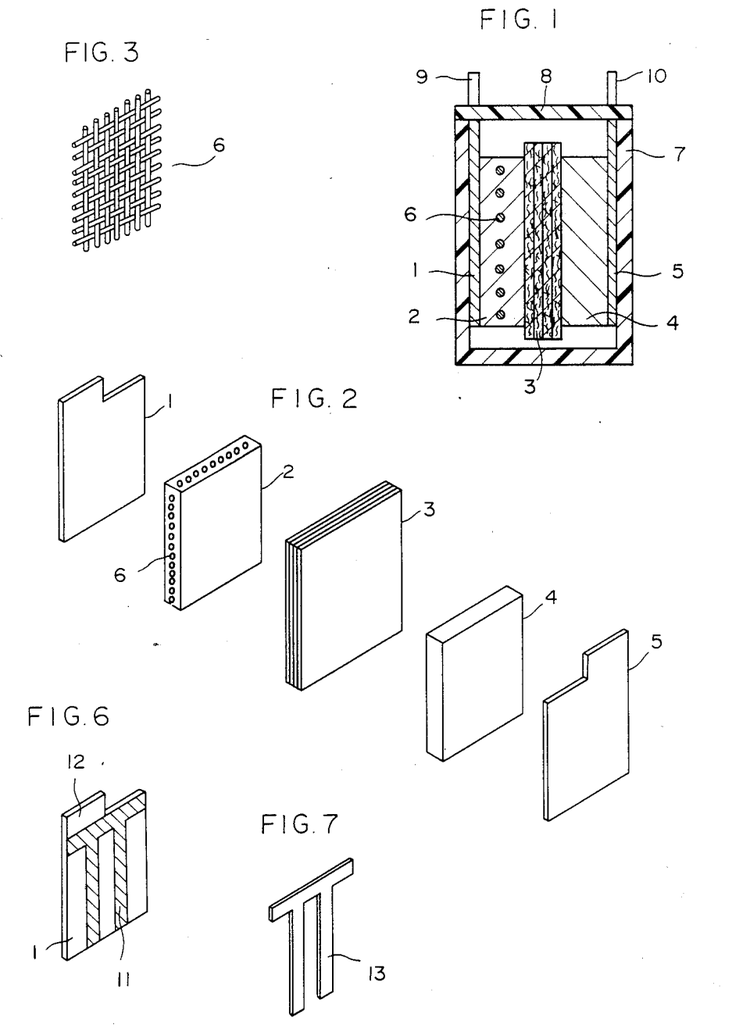
FIG. 1 is a longitudinal section of a lead-acid cell according to an embodiment of the invention.
FIG. 2 is a perspective exploded view of elements constituting the generating element of the lead-acid cell of FIG. 1.
FIG. 3 is a perspective view of a net-like body to be embedded in the positive active material layer shown in FIGS. 1 and 2.
FIG. 6 is a perspective view showing a modification of the positive collector.
FIG. 7 is a perspective view of an insulation sheet used in place of the band-like insulation layer of the positive collector of FIG. 6.

Referring to FIGS. 1 and 2, the generating element of this lead-acid cell includes a positive current collector 1, a positive active material layer 2, a separator 3, a negative active material layer 4 and a negative current collector 5. The positive active material layer 4 and positive current collector 5 are flat plates and made, e.g. of a lead alloy containing 0.07% calcium. The positive active material layer 2 has a net-like body 6 made of resin, as shown in FIG. 3, embedded therein. The net-like body may be made, e.g., of polypropylene, polyethylene, polyester or vinyl chloride and may be a net formed by weaving filaments, as shown in FIG. 3, or, though not shown, it may be a molding in net form. The separator 3 is a multi-separator formed of glass fiber.

The elements described above will be stacked in the order shown in FIG. 2, and put in an electrolytic container 7, as shown in FIG. 1. The electrolytic container 7 is made, e.g., of ABS resin. The elements 1-6 described above, when put in the electrolytic container 7, are pressed to a suitable degree, e.g., about 2-4 kg/cm². Thereafter, a predetermined amount of electrolyte is poured in and is retained by the separator 3, and the electrolytic container 7 is closed by an electrolytic container lid 8. In addition, the current collectors 1 and 5 have outer terminals 9 and 10 electrically connected thereto, respectively, said outer terminals 9 and 10 being led out through the electrolytic container lid 8.

Figure 4:
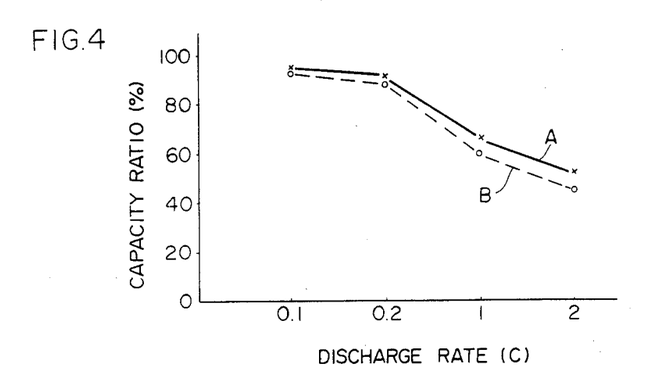
FIGS. 4 and 5 are graphs which compare the performances of a lead-acid cell (A) according to the invention and a conventional lead-acid cell (B), FIG. 4 showing the initial characteristic and FIG. 5 showing the cycle characteristic.
Figure 5:
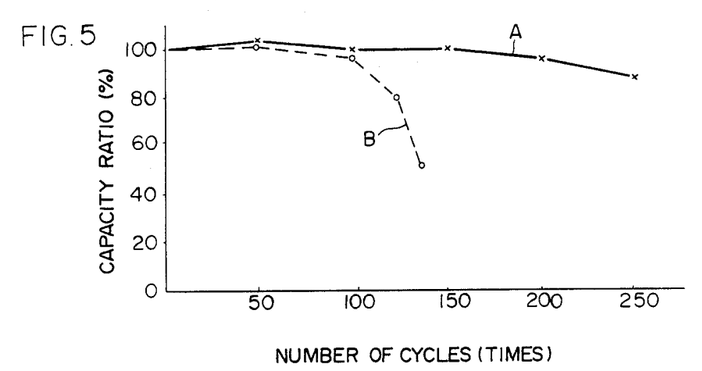

Referring to FIGS. 4 and 5, the performances of a lead-acid cell (A) according to this invention and a conventional lead-acid cell (B) are compared. The conventional lead-acid cell (B) uses current collectors made of led or lead alloy in net form by the expand working method. FIG. 4 compares the initial characteristics of the lead-acid cells, showing the degree of degradation in capacity (ampere-hours) where the discharge rate is changed from 0.1 C to 2 C, the vertical axis representing the percentage of capacity where the capacity when discharging a current of 0.05 C is taken as 100. As can be seen from FIG. 4, even if the discharge rate is increased, the lead-acid cell (A) according to the invention almost never differs in degradation of capacity from the conventional lead-acid cell (B), rather it can be said that its degradation is lower. FIG. 5 shows the cycle characteristic representing degradation of capacity when charge and discharge are repeated; the conditions for charge and discharge were such that charge was at constant voltage and discharge was effected with a current of 0.2 C, the final voltage for discharge being 1.7 V. As can be seen from FIG. 5, there is a remarkable difference between the lead-acid cells (A) and (B), the lead-acid cell (A) according to this invention exhibiting a superior cycle characteristic as compared with the conventional lead-acid cell (B).

The following table shows a comparison between the current collectors used in said lead-acid cells (A) and (B), the numerical value for each item being 100 for the current collector obtained by the expand working method.

TABLE

|  | Material thickness | Weight | Price |
| --- | --- | --- | --- |
| This invention | 30 | 70 | 55 |
| Prior Art (expand plate) | 100 | 100 | 100 |

As is clear from the above table, the current collector according to this invention is lower in material thickness, weight and price than the conventional one, makes it possible to reduce the weight and size of lead-acid cells and is superior in reduction of cost.

Referring to FIG. 6, a preferred modification of the positive current collector is shown. The positive current collector 1 shown therein is made of the same material as the positive current collector 1 shown in FIGS. 1 and 2 and is a flat plate having a thickness, e.g., of 0.3 mm. The surface of the positive current collector 1 opposed to the positive active material layer 2 (FIGS. 1 and 2) is formed with an electrolyte-resistant band-like insulation layer 11. The formation of the band-like insulation layer 11 is effected as by coating with epoxy resin.

The band-like insulation layer 11 serves to prevent the portion of the positive current collector 1 covered by the band-like insulation layer 11 from being corroded by the electrolyte. Such prevention of corrosion is intended to retain the conductivity of the current collector and suppress degradation of cycle characteristic due to corrosion of the current collector. From this point of view, the band-like insulation layer 11 is formed to extend toward the electron take-out portion 12 of the current collector 1. On the other hand, in order to make effective use of all the active material of the positive active material layer 2 contacting the positive current collector 1, the width of the band-like insulation layer 11 should not be so large. This is because the band-like insulation layer 11 is literally of an insulating nature, thus preventing the portion of the positive current collector 1 covered by the band-like insulation layer 11 from exhibiting its electricity collecting effect. In this connection, a study was made on the limit value of electrode internal resistance at a charge with a current of 4 C which was considered to be at a maximum in practice, and it was concluded that in order to ensure the effective action of the active material, it was sufficient if the active material was located within a distance of 5 mm from the conductive portion of the current collector. That is, at a discharge with a current of 4 C, in order to make effective use of all the active material, it follows that if the band-like insulation layer 11 is formed on one surface of the positive current collector 1 so that its width is less than 10 mm, all the active material contacting the band-like insulation layer 11 can be used for collection of electricity by the positive current collector 1.

In the illustrated embodiment, the band-like insulation layer 11 is formed so that its width is, e.g., 8 mm.

A lead-acid cell using the positive current collector 1 shown in FIG. 6 is termed (A) and a lead-acid cell in which instead of the band-like insulation layer 11 in the form of an epoxy resin coating shown in FIG. 6, an insulation sheet 13 made of polyethylene coating shaped as shown in FIG. 7 is interposed between the positive current collector 1 and the positive active material layer 2, is termed (B). For comparison purposes, a lead-acid cell having applied thereto neither the band-like insulation layer 11 nor the insulation sheet 13 is termed (C). A comparison of the performances of these lead-acid cells (A), (B) and (C) is shown in FIGS. 8 and 9.

Figure 8:
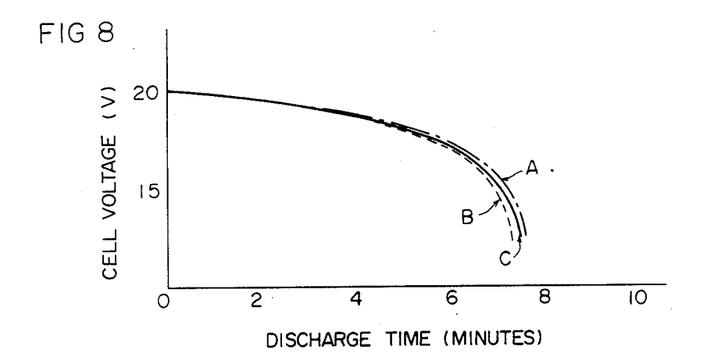
FIGS. 8 and 9 are graphs which compare the performances of a lead-acid cell (A) using the positive current collector of FIG. 6, a lead-acid cell (B) using the insulation sheet of FIG. 7 and a lead-acid cell (C) having no band-like insulation layer, FIG. 8 showing the discharge characteristic and FIG. 9 showing the cycle characteristic.
Figure 9:
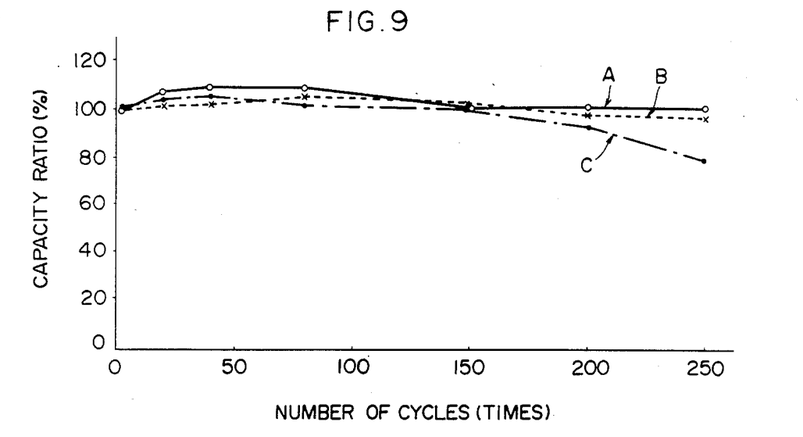

FIG. 8 shows a discharge characteristic for a discharge current of 4 C, and FIG. 9 shows a cycle characteristic corresponding to FIG. 5. The charge and discharge conditions are the same as in FIG. 5.

As is clear from FIGS. 8 and 9, the lead-acid cells (A) and (B) using a positive plate having the band-like insulation layer 11 or insulation sheet 13 have a discharge characteristic equivalent to that of the cell (C) having no such band-like insulation layer and are improved in cycle characteristic.

Figure 10:
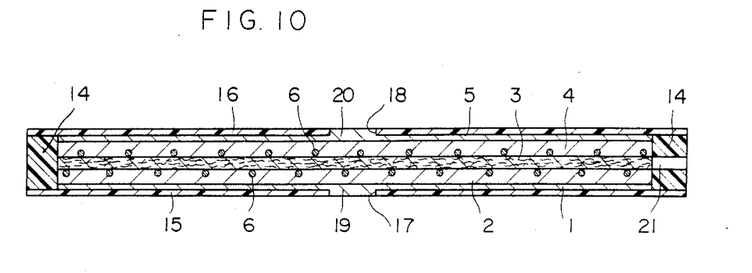
FIG. 10 is a longitudinal section of a lead-acid cell according to the invention.
Figure 11:
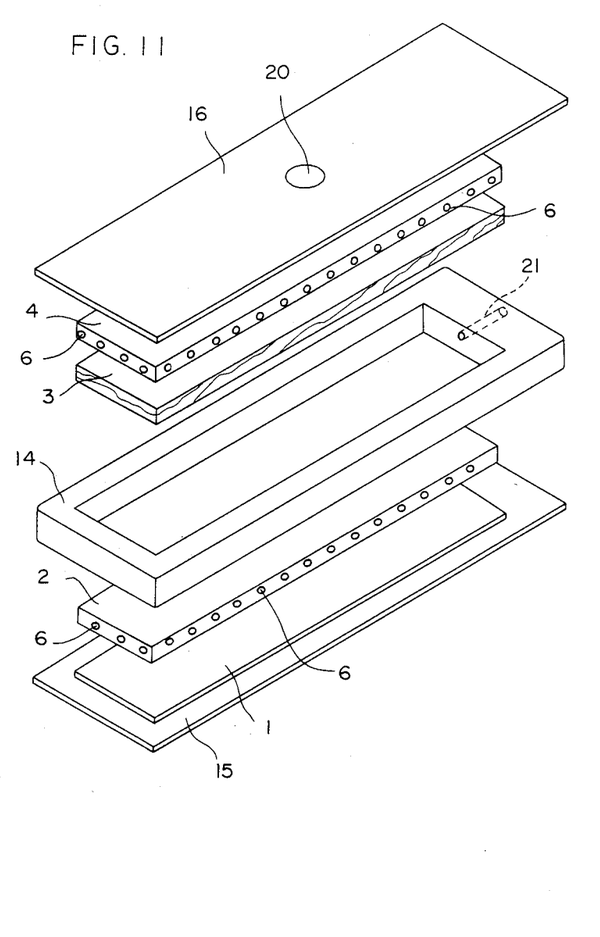
FIG. 11 is a perspective exploded view of elements of the lead-acid cell of FIG. 10.

FIGS. 10 and 11 show an embodiment of a lead-acid cell different in external shape from the lead-acid cell shown in FIG. 1.

Though different in overall shape, it is the same as the cell shown in FIG. 1 in that the positive current collector 1, positive active material layer 2, separator 3, negative active material layer 4, and negative current collector 5 are stacked in the order mentioned. The generating element constituted of these elements is positioned in a frame body 14 made of resin. The end surfaces of the frame body 14 have placed thereon armor plates 15 and 16 made, e.g., of ABS resin, the peripheral edges of said armor plates 15 and 16 being fixed to the frame body 14 by an adhesive agent or by high frequency fusion. In addition, although the frame body 14 has been prepared separately from the armor plates 15 and 16, it may be integral with said armor plate 15 or 16.

The current collectors 1 and 5 are flat plates and made of lead or lead alloy. The armor plates 15 and 16 are formed with throughgoing holes 17 and 18, respectively, which receive step-like terminals 19 and 20 formed on the current collectors 1 and 5, respectively. The step-like terminals 19 and 20 are used as outer terminals for the lead-acid cell.

The positive and negative active material layers 2 and 4 each have a net-like body 6 of resin embedded therein. What is to be noted here is the position of the net-like bodies 6 in the active material layers 2 and 4. That is, the net-like body 6 is deviated to one side of the active material layer 2 or 4 in the direction of its thickness so that it may not contact with the corresponding current collector 1 or 5. This deviation of the net-like bodies 6 to one side can be attained by placing the active material paste on the net-like body 6 when the active material layer is formed and pressing the same in that condition.

If the net-like bodies 6 are embedded at positions where they do not contact the corresponding current collectors 1 and 5, the binding force on the current collector and active material is increased since the active material and the product of corrosion on the current collector surface in the presence of the electrolyte which is sulfuric acid are the same in composition. Besides this, at the positive plate, the presence of the net-like body 6 makes it possible to expect an action which prevents expansion of the positive active material layer 2.

Though not shown, the current collectors 1 and 5 and the corresponding armor plates 15 and 16 are fixed together as by epoxy adhesive agent. This is for the purpose of preventing leakage of the electrolyte through the clearances between the current collectors 1 and 5 and the armor plates 15 and 16, whereby a casing construction of high reliability can be obtained.

The method of assembling the lead-acid cell shown in FIGS. 10 and 11 is as follows. First, the positive and negative current collectors 1 and 5 are fixed to the armor plates 15 and 16, respectively, in advance. These, together with the other elements, i.e., the positive and negative active material layers 2 and 4, separator 3 and frame body 14, are stacked in the positional relation shown in FIG. 11, and the armor plates 15 and 16 are fixed around their peripheries to the frame body 14. Next, a predetermined amount of electrolyte is poured in through a liquid pouring port 21 extending laterally through the frame body 14, whereupon the liquid pouring port 21 is closed. In this way, a 2-volt type thin plate-like lead-acid cell is obtained.

Figure 12:
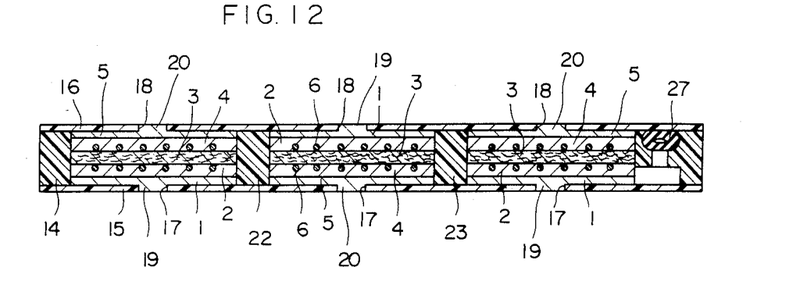
FIG. 12 is a longitudinal section of a lead acid battery according to a further embodiment of the invention.
Figure 13:
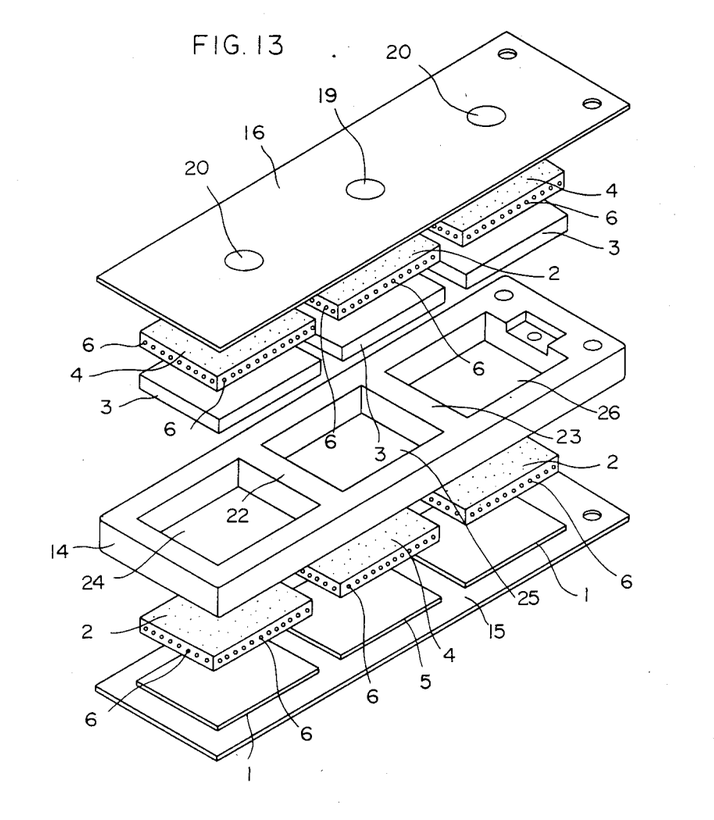
FIG. 13 is a perspective exploded view of elements of the lead-acid battery of FIG. 12.

A lead-acid battery shown in FIGS. 12 and 13 is of the 6-volt type. That is, a frame body 14 shown therein has two partition walls 22 and 23 defining three compartments 24, 25 and 26. Each of the compartments 24, 25 and 26 receives a unit cell comprising an positive active material layer 2 and a negative active material layer 4 which are opposed to each other with a separator 3 interposed therebetween, and a positive current collector 2 and a negative current collector 5 which are positioned at the back of the associated active material layers. The current collectors 1 and 5 are fixed to the corresponding armor plates 15 and 16 by an adhesive agent, and step-like terminals 19 and 20 respectively extending integrally from the current collectors 1 and 5 extend through throughgoing holes 17 and 18 in the armor plates 15 and 16 and appear at the surfaces of the armor plates 15 and 16. The three unit cells will be connected in series with each other by a conductor in the form, e.g., of a copper foil (not shown). To facilitate this series connection, it is preferable that the unit cells be received so that their polarities alternate with each other. In FIG. 12, the reference numeral 27 denotes a rubber valve body constituting a safety valve.

Referring to FIGS. 14 through 17, the construction and the method of producing a cylindrical lead-acid cell are illustrated.

Figure 14:
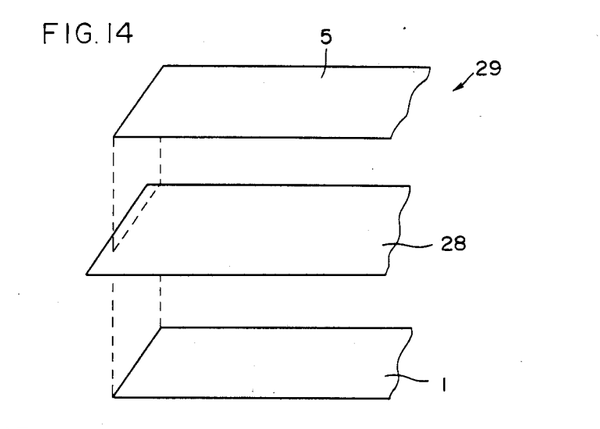
FIG. 14 is a perspective exploded view of a current collector assembly in a laminated state.

Referring to FIG. 14, two band-like flat plates of lead or lead alloy cut to predescribed size are prepared, serving as an positive current collector 1 and a negative current collector 5. These current collectors 1 and 5 are bonded to each other through a thin sheet-like insulator 28 of polyester or the like. In this way, a current collector assembly 29 is formed. In this case, the insulator 28 may be greater in width than the current collectors 1 and 5. Then, even if the current collectors 1 and 5, when placed one upon the other, are deviated from each other, they can be insulated from each other.

Figure 15:
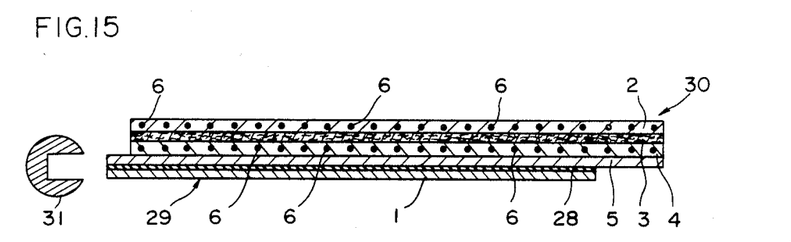
FIG. 15 is a sectional view showing a generating element in a state prior to winding.

Referring to FIG. 15, apart from the aforesaid current collector assembly 29, there is prepared an active material sheet assembly 30 including a positive active material layer 2 and a negative active material layer 4 which are laminated with a separator 3 interposed therebetween. The active material sheet assembly 30 is placed on one surface of the current collector assembly 29, e.g., the surface where the positive current collector 5 is placed. Then, the negative current collector 5 and the negative active material layer 4 come in contact with each other.

Figure 16:
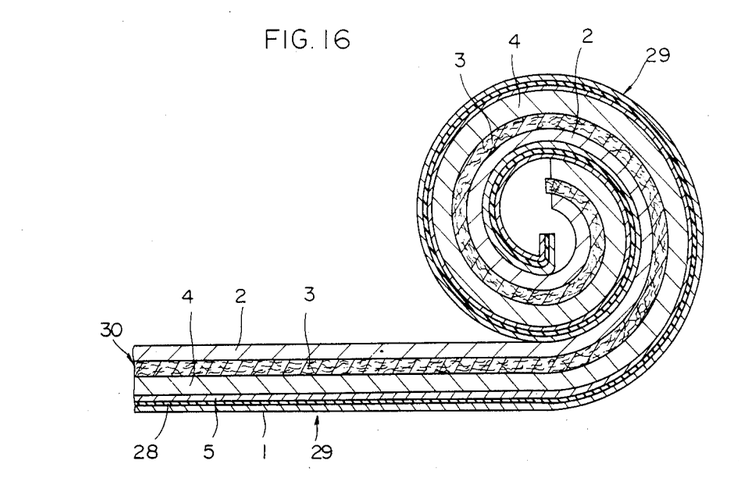
FIG. 16 is a sectional view showing the generating element being wound.

The generating element composed of the current collector assembly 29 and the active material sheet assembly 30 arranged as shown in FIG. 15 is then wound. In this case, a winding jig 31 having a cross-sectional shape shown in FIG. 15 is used. The winding jig 31 holds one end of the current collector assembly 29, and the generating element is tightly wound by using press rollers (not shown) exerting a suitable pressure, with the winding jig 31 as a core, so that the current collector assembly 20 is disposed outside the active material sheet assembly 30. An intermediate stage of the winding operation is shown in FIG. 16. In addition, in FIG. 16, the winding jig 31 and the net-like bodies 6 embedded in the active material layers 2 and 4 are omitted from the illustration.

In such winding, since it is a portion of the current collector assembly 29 having a relatively high mechanical strength that is held by the winding jig 31, the hold by the winding jig 31 is very firm. Moreover, since the winding is started from this current collector assembly 29, there is no danger of damage to the generating element and tight winding becomes possible. Further, in the state of FIG. 16, when the generating element is wound, the press rollers (not shown) contacting the winding from opposite sides come to contact the current collector assembly 29. Therefore, tight winding can be effected without having to pay any special attention, unlike the case where the press roller contact an element of low mechanical strength such as the separator 3 or the active material layer 2 or 4.

Figure 17:
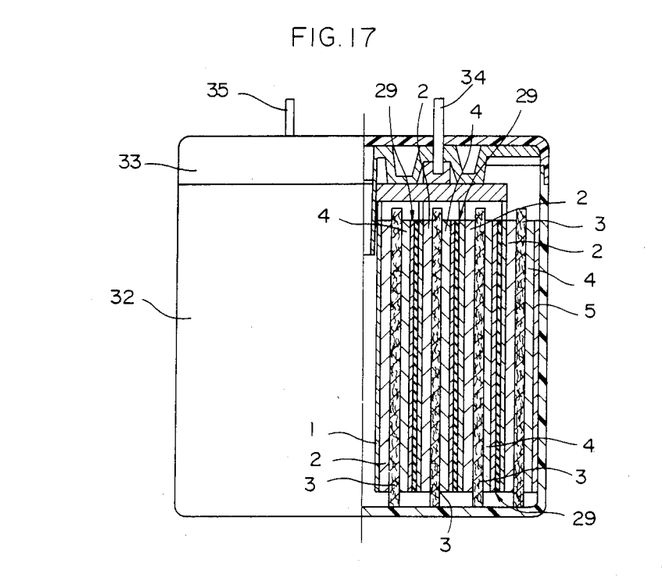
FIG. 17 is a half-sectional view of a cylindrical lead-acid cell thus obtained.

Referring to FIG. 17, a cylindrical lead-acid cell having a circinately wound generating element is shown. In FIG. 17, the numeral 32 denotes an electrolytic container body; 33 denotes an electrolytic container lid; and 34 and 35 denote outer terminals.

As a further embodiment of the lead-acid cell of this invention, there may be contemplated an arrangement wherein a number of unit generating elements having pairs of positive and negative plates shown in FIGS. 1 and 2 are placed one upon another.

I claim:
1. A lead acid cell, which comprises:
a negative electrode;
a positive electrode; and
a separator interposed between the negative and positive electrodes, the separator being adapted to retain an electrolyte, the positive electrode including an active material layer, a net-like body of resin embedded in the active material layer, a current collector having a solid, plate-like structure, and an electrolyte-resistant band-like insulation layer, the solid current collector being placed in close contact with a surface of the active material layer, the solid current collector being formed of lead or lead alloy, the current collector including a terminal take-out portion, the insulation layer being interposed partly between the current collector and the active material layer and extending toward the terminal take-out portion.

2. A lead-acid cell as set forth in claim 1, wherein said net-like body is positioned so that it does not contact said current collector.

3. A lead-acid cell as set forth in claim 1, wherein said separator and said negative and positive electrodes are circinately wound in closely contacted relation to each other.

4. A lead-acid cell as set forth in claim 3, including an insulator interposed between said negative and positive electrodes.

* * * * *